US012003810B2

(12) United States Patent
Greene

(10) Patent No.: US 12,003,810 B2
(45) Date of Patent: Jun. 4, 2024

(54) APPARATUS, SYSTEMS AND METHODS FOR BUFFERING OF MEDIA CONTENT

(71) Applicant: DISH Technologies L.L.C., Englewood, CO (US)

(72) Inventor: Gregory Greene, Littleton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 17/980,416

(22) Filed: Nov. 3, 2022

(65) Prior Publication Data

US 2023/0058619 A1 Feb. 23, 2023

Related U.S. Application Data

(63) Continuation of application No. 17/148,493, filed on Jan. 13, 2021, now Pat. No. 11,496,794, which is a continuation of application No. 16/536,616, filed on Aug. 9, 2019, now Pat. No. 10,904,613, which is a continuation of application No. 14/883,793, filed on Oct. 15, 2015, now Pat. No. 10,382,815.

(51) Int. Cl.
H04N 21/44 (2011.01)
H04N 21/426 (2011.01)
H04N 21/434 (2011.01)
H04N 21/472 (2011.01)
H04N 21/482 (2011.01)
H04N 21/433 (2011.01)
H04N 21/438 (2011.01)

(52) U.S. Cl.
CPC ... *H04N 21/44004* (2013.01); *H04N 21/4263* (2013.01); *H04N 21/4347* (2013.01); *H04N 21/47217* (2013.01); *H04N 21/4821* (2013.01); *H04N 21/4333* (2013.01); *H04N 21/4384* (2013.01)

(58) Field of Classification Search
CPC .......... H04N 21/4263; H04N 21/4333; H04N 21/4347; H04N 21/4384; H04N 21/44004; H04N 21/47217; H04N 21/4821
See application file for complete search history.

(56) References Cited

U.S. PATENT DOCUMENTS

| 10,382,815 | B2 | 8/2019 | Greene |
| 10,904,613 | B2 | 1/2021 | Greene |
| 2002/0168178 | A1 | 11/2002 | Rodriguez et al. |
| 2005/0002639 | A1* | 1/2005 | Putterman ............ H04N 7/163 386/219 |

(Continued)

Primary Examiner — Alazar Tilahun
(74) Attorney, Agent, or Firm — Perkins Coie LLP

(57) ABSTRACT

Media content presentation systems and methods are operable to present media content received by a media device, wherein the media device comprises a plurality of tuner systems. An exemplary embodiment tunes the plurality of tuners to receive different broadcasting media content streams each comprising a streaming media content event; communicates the streaming media content events from the receiving tuner to a corresponding tuner buffer of the tuner system; and stores a portion of the streaming media content events into the corresponding tuner buffers. When a user selection is received for presentation of one of the streaming media content events, the selected one of the streaming media content events are presented to a user of the media device.

15 Claims, 4 Drawing Sheets

(56) References Cited

U.S. PATENT DOCUMENTS

| | | |
|---|---|---|
| 2008/0002938 A1 | 1/2008 | Osborne |
| 2008/0204604 A1* | 8/2008 | Campbell .......... H04N 21/4263 |
| | | 348/731 |
| 2011/0307914 A1* | 12/2011 | Blight ................... H04N 5/781 |
| | | 725/133 |
| 2014/0201802 A1 | 7/2014 | Boss et al. |
| 2014/0282759 A1 | 9/2014 | Harvey et al. |
| 2015/0304706 A1* | 10/2015 | Mun ................. H04N 21/4826 |
| | | 725/39 |
| 2021/0136446 A1 | 5/2021 | Greene |

* cited by examiner

APPARATUS, SYSTEMS AND METHODS FOR BUFFERING OF MEDIA CONTENT

PRIORITY CLAIM

This patent application is a Continuation of U.S. Non-Provisional patent application Ser. No. 17/148,493, filed Jan. 13, 2021, entitled "APPARATUS, SYSTEMS AND METHODS FOR BUFFERING OF MEDIA CONTENT," which is a Continuation of U.S. Non-Provisional patent application Ser. No. 16/536,616, filed Aug. 9, 2019, entitled "APPARATUS, SYSTEMS AND METHODS FOR BUFFERING OF MEDIA CONTENT," which is Continuation of U.S. Non-Provisional patent application Ser. No. 14/883,793, filed Oct. 15, 2015, entitled "APPARATUS, SYSTEMS AND METHODS FOR BUFFERING OF MEDIA CONTENT," and issued as U.S. Pat. No. 10,382,815 on Aug. 13, 2019, the contents of which is herein incorporated by reference in their entirety.

BACKGROUND

Media devices, such as a set top box, a stereo, a television, a computer system, a game system, or other electronic media device may be configured to receive a broadcast of media content that has a video portion which is presented on a display to a viewing user of the media device. Typically, the broadcast media content comprises a series of media content events. A media content event often presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

The video portion of a media content event is presented as a sequential series of still images, interchangeably referred to herein as video frames. Each video frame of a media content event is presented for a brief duration, then the next video frame is presented, thus creating the perception of a moving image by the viewing user. Depending upon the media device and the components of the associated media content presentation system (the display and speakers), as many as sixteen, thirty, or even a higher number of video frames per second are presented to the viewing user in an example media presentation system (though any suitable presentation rate of the video frames may be used). This stream of serially presented video frames is interchangeably referred to as a stream of video content.

The audio portion of the media content event is also processed into a stream of audio content for presentation as sound to the user. The audio content is presented in synchronism with presentation of the streaming video content. For example, the viewer may see actors performing on the display (the presented streaming video portion of the media content event) while hearing the audio track (the presented audio portion of the media content event). The synchronously presented audio track may include dialogue (the actor's speech), music, or other background sound effects.

The media device may receive the media content, provided by a media content provider, from a variety of sources. An example source of media content is provided to the media device via a broadcast-based media content distribution system to which the media device is communicatively coupled to. Example of broadcast-based media content distribution system include a satellite system, an over-the-air system, or a cable system. Any suitable media content distribution system may provide broadcasted media content to the media device.

Typically, many different media devices are also coupled to the broadcast-based media content distribution system. The media content provider broadcasts the media content over the media content distribution system as a stream of media content using a suitable broadcast format. One non-limiting example media content broadcasting format is the moving picture experts group (MPEG) format that enables compression and transmission of a stream of media content. Other media content transmission formats may be used to broadcast a stream of content to the receiving media devices.

Typically, the media content provider is concurrently broadcasting many different media content events to the plurality of media devices. Each media device, based on a specification made by its user, selects a particular one of the many different broadcasting media content events. The selected media content event is then presented to the user of that media device. Alternatively, or additionally, the selected media content event may be saved (recorded) in a memory medium for future presentation.

Based on the user specification, the media device "tunes" itself to receive the user-selected broadcasting media content event. Here, tuning is the process of selecting a particular media content stream from a plurality of different detectable media content streams, and processing the selected media content stream to access the user-selected media content stream. As the stream of broadcasting media content is being received at the media device, the media device processes the user-selected media content stream from the received broadcasting format into a format that is suitable for presentation by the components of the media content presentation system. That is, the received broadcasting stream of media content is processed into the series of serially presented video frames (and associated audio content).

To facilitate the timing of presentation of the series of serially presented video frames (and the associated audio content), some current portion of the processed media content is temporarily stored in a content buffer. After some amount of the received broadcasting stream of media content has been processed (into video frames and the associated audio content) and stored in the content buffer, the buffered portion of the processed media content event begins to be streamed out to the components of the media content presentation system (the display and the speakers). That is, some predefined number and/or presentation duration of video frames (and the associated audio content) are stacked up into the content buffer so that the output of the video frames (and the associated audio content) from the content buffer can be managed such that a continuous stream of correctly timed video frames (and the associated audio content) are provided to the components of the media content presentation system. This storing of video frames (and the associated audio content) into the content buffer is interchangeably referred to herein as "buffering" of the media content.

On occasion, discontinuities or interruptions may occur during the reception of the broadcasting media content event over the media content distribution system. Additionally, or alternatively, the data in a stream of broadcasting media content may be received at different rates at different times over the media content distribution system. Further, processing time for generating individual video frames may vary because of the particular media content compression format being used to transmit the broadcasting media content, such as but not limited to the processing of I-frames (intra coded frame or slice), P-frames (predicted frame of slice) or B-frames (bi-directional predicted frame or slice), that are compressible to different degrees in an MPEG stream. Thus, the use of the content buffer permits the presentation of a continuous stream of correctly timed video frames (and the associated audio content) out from the media device to the components of the media content presentation system, even when reception of the broadcasting media content varies.

A media device typically provides various presentation trick play functionality that permits the user to control the presentation of a media content event. The presentation trick play functions control the flow of the media content (the video frames and the associated audio content) out from the content buffer to the components of the media content presentation system (the display that presents the video frames and the speakers that synchronously present the audio content).

An example presentation trick play function is the "pause" function wherein presentation of the video portion of the media content event on the display is temporarily halted in response to a user request. During a pause operation initiated by the user, a single selected video frame may be presented on the display (thus showing a single still image). Presentation of the audio portion is also halted. Thus, the user views a single still image presented on the display, typically the last video frame output from the content buffer, and hears no audio content.

When the user ends the pause operation, presentation of the media content resumes. During a pause operation, the broadcasting media content is still being received by the media device. This continuing stream of received media content is being processed into video frames (and the associated audio content), and is being stored into the content buffer, during the pause operation. Thus, when presentation of the media content event resumes when the pause operation concludes, the portion of the media content event received during the pause operation is available for presentation since it has been stored in the content buffer.

Another presentation trick play function typically provided by a media device is a rewind function. During normal presentation of the media content event, the video frames (and the associated audio content) are sequentially and serially streamed out of the content buffer to the components of the media content presentation system. However, the output video frames (and the associated audio content) are not deleted, removed, or otherwise erased from the content buffer as they are streamed out for presentation on the display. Rather, the video frames (and the associated audio content) remain stored in the content buffer for at least some duration. When the user initiates a rewind operation, the flow of presentation of the video frames may be reversed such that the moving image perceived by the user is shown in a backward or reverse manner. That is, the previously presented video frames are accessed from the content buffer and are then presented sequentially in a reverse order. Audio content is typically halted during a rewind operation. The rewind operation may be performed at a normal speed (at the same rate of presentation that the video frames were initially presented), at a lower rate (slow motion reverse presentation), or at a higher rate (fast speed reverse presentation).

A rewind operation may continue up until the last buffered (stored) video frame has been presented or when the user terminates the rewind operation. When the rewind operation ends, either when there are no earlier received video frames available from the content buffer or when the user ends the rewind process, then presentation of the media content event may resume or may be paused at that point. Thus, the user may review previously presented portions of the media content event, at least to the extent that such media content remains stored in the content buffer.

Another presentation trick play function typically provided by a media device is a fast forward operation. Here, the presentation rate of the video frames is increased such that the user perceives a fast forward playing of the video content. The fast forward operation may be done by decreasing presentation time of individual video frames and/or by skipping over selected video frames (such that selected video frames are not presented). Typically, presentation of the audio content is halted during a fast forward operation.

Thus, the user may more quickly advance presentation of the media content. However, the extent of fast forward presentation is limited by the amount of video content that has been received, processed, and stored into the content buffer prior to the initiation of the fast forward operation. That is, fast forward presentation cannot be ahead of "live" presentation of the media content event (the time that the current portion of the media content event is being received at the media device via the broadcast-based media content distribution system).

Other presentation trick play functions may also be provided for management of media content presentation from the content buffer. Jump forward and jump backward operations may advance or replay presentation of the media content event by some predefined duration. However, such jump forward and jump backward operations are similarly limited by extent of the number of video frames (and the associated audio content) stored in the content buffer.

In many media devices, the content buffer of a media device has a relatively large memory storage capacity. Some media devices may have a content buffer that has sufficient memory storage capacity to store up to an hour of high definition media content. However, even with large capacity content buffers, several practical limitations remain.

For example, only a single media content event is buffered into the content buffer. Thus, if the user changes "channels" to a different media content event, the media device must re-tune itself to receive and process the newly selected media content event. The newly selected media content event is processed into video frames (and the associated audio content), and is then stored into the content buffer. Once a relatively small duration or number of video frames (and the associated audio content) of the newly selected media content event have been buffered into the content buffer, the streaming of the buffered video frames out to the components of the media content presentation system may begin. However, at this juncture, the forward play or reverse play type presentation trick play functions are not available for the newly selected media content event since there is no accumulated (buffered) video frames (and the associated audio content) in the content buffer for the newly selected media content event.

Further, once the media device has tuned to the newly selected media content event and begins saving those video frames into the content buffer, subsequently received portions of the previously presented media content event are not processed and saved into the content buffer. Accordingly, the various presentation trick play functions are not available for the later broadcast portions of the previously presented media content event since there is no accumulated (buffered) video frames (and the associated audio content) in the content buffer.

Also, media devices are often not configured to rewind back in time past the beginning of the newly selected media content event. Thus, the user is not able to later view previous or subsequent portions of the previously presented media content event that might remain buffered in the content buffer.

Accordingly, there is a need in the arts to improve management of the content buffer so that various presentation trick play functions are available to the user after the user specifies presentation of a new media content event.

SUMMARY

Media content presentation systems and methods are operable to present media content received by a media device, wherein the media device comprises a plurality of tuner systems. An exemplary embodiment tunes the plurality of tuners to receive different broadcasting media content streams each comprising a streaming media content event; communicates the streaming media content events from the receiving tuner to a corresponding tuner buffer of the tuner system; and stores a portion of the streaming media content events into the corresponding tuner buffers. When a user selection is received for presentation of one of the streaming media content events, the selected one of the streaming media content events are presented to a user of the media device.

BRIEF DESCRIPTION OF THE DRAWINGS

Preferred and alternative embodiments are described in detail below with reference to the following drawings.

DETAILED DESCRIPTION

Figure 1:
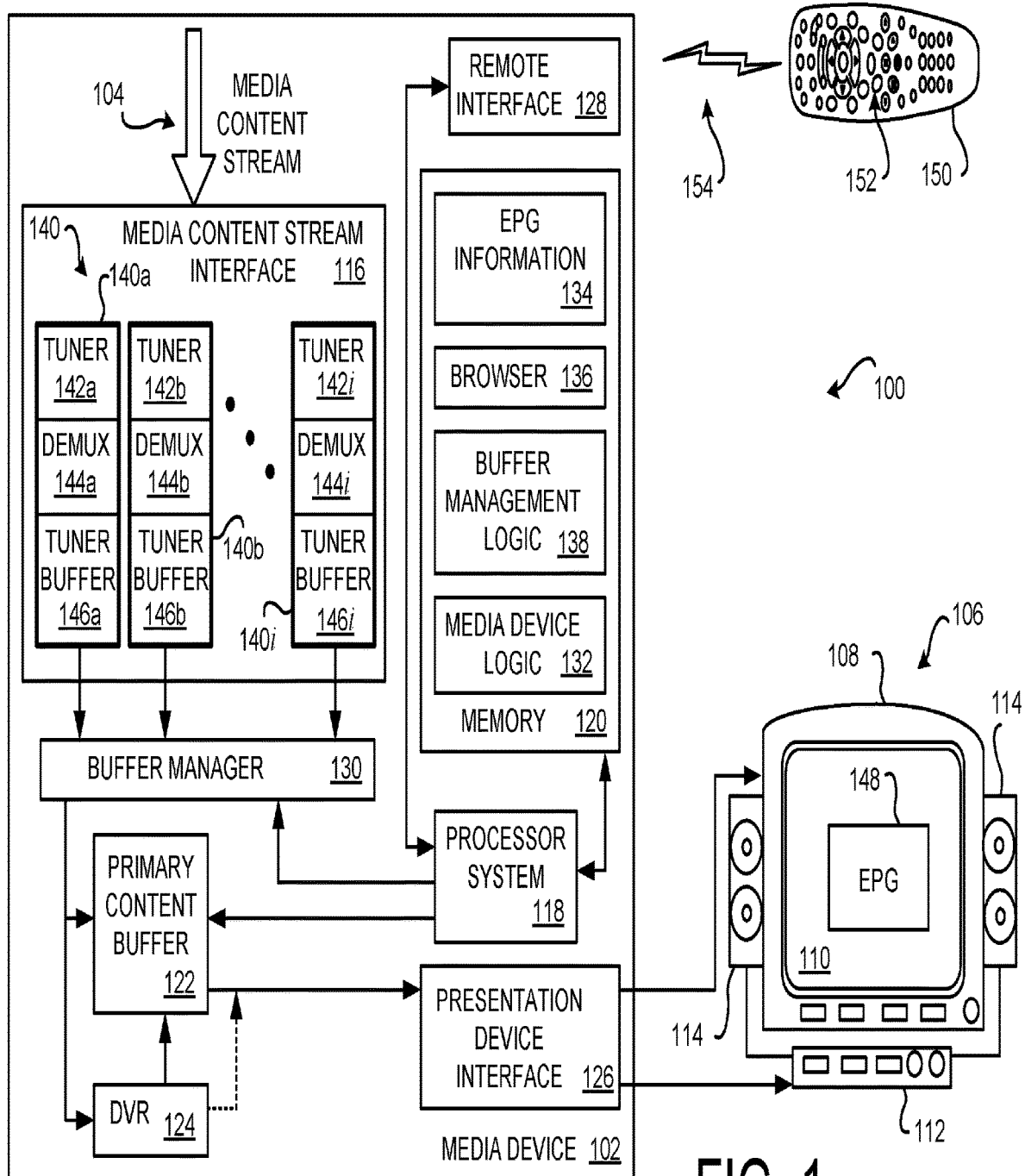
FIG. 1 is a block diagram of an example embodiment of a media content buffer management system.

FIG. 1 is a block diagram of an example embodiment of a media content buffer management system 100 implemented in a media device 102, such as, but not limited to, a set top box (STB). Embodiments of the media content buffer management system 100 may be implemented in other media devices, such as, but not limited to, a stereo, a surround-sound receiver, a radio, a television (TV), a digital video disc (DVD) player, a digital video recorder (DVR), a game playing device, a smart phone, or a personal computer (PC) that are configured to buffer (temporarily store) received broadcasted media content.

Embodiments of the media content buffer management system 100 provide an enhanced content buffer system. Using embodiments of the media content buffer management system 100, a user of the media device 102 may access buffered media content from a number of different media content events that are received in one or more broadcast media content streams 104. Further, the user is able to use one or more presentation trick play function operations to adjust presentation of the plurality of different buffered media content events, at least to the extent of the buffered media content.

The exemplary media device 102 is communicatively coupled to a media presentation system 106 that includes a visual display device 108, such as a television (hereafter, generically a TV) that presented video content on a display 110, and an audio presentation device 112, such as a surround sound receiver controlling an audio reproduction device (that outputs or reproduces the audio content from one or more speakers 114). Other types of output devices may also be coupled to the media device 102, including those providing any sort of stimuli sensible by a human being, such as temperature, vibration and the like. The video portion of the media content event is displayed on the display 110 and the audio portion of the media content event is reproducible as sounds by one or more speakers 114. In some embodiments, the media device 102 and one or more of the components of the media presentation system 106 may be integrated into a single electronic device.

The non-limiting exemplary media device 102 comprises a media content stream interface 116, a processor system 118, a memory 120, a primary content buffer 122, an optional digital video recorder (DVR) 124, a presentation device interface 126, an optional remote interface 128, and a buffer manager 130. The memory 120 comprises portions for storing the media device logic 132, the electronic program guide (EPG) information 134, an optional browser 136, and the buffer management logic 138. In some embodiments, the media device logic 132, the browser 136, and/or the buffer management logic 138 may be integrated together, and/or may be integrated with other logic. In other embodiments, some or all of these memory and other data manipulation functions may be provided using a remote server or other electronic devices suitably connected via the Internet or otherwise to a client device. For example, but not limited to, the buffer manager 130 may be implemented as device with a memory and/or processor (not shown) such that the buffer management logic 138 resides locally in the buffer manager 130. Other media devices 102 may include some, or may omit some, of the above-described media processing components. Further, additional components not described herein may be included in alternative embodiments.

The functionality of the media device 102, here a set top box, is now broadly described. In a satellite broadcast system, a media content provider provides media content that is received in one or more multiple media content streams 104 multiplexed together (interleaved) into one of a plurality of transport channels. The transport channels with the media content streams 104 are communicated to the media device 102 from a media system sourced from a remote head end facility (not shown) operated by the media content provider. The media device 102 is communicatively coupled to an antenna (not shown) that is configured to receive a plurality of different transport channels, each communicated (broadcast) from the satellites at a particular frequency.

In an over-the-air broadcast environment, the media device 102 may receive a plurality of different locally broadcast media content streams 104. Each locally broadcast media content stream 104 is broadcast at a particular predefined frequency in an over the air radio frequency (RF) signal that is detectable by the media device 102.

In a cable environment, the media device is physically coupled to a cable connector (not shown) such as a coaxial cable, a fiber optic cable, or the like. The media device 102 receives a plurality of different media content streams 104 via the cable connector. In one application, a media content provider provides media content that is received in one or more multiple media content streams 104 multiplexed together and/or broadcast at particular frequencies over the cable connector. Alternatively, or additionally, the browser 136 may be operated to communicatively couple the media device 102 to a website, via the Internet, that is providing media content.

The one or more media content streams 104 are received by the media content stream interface 116. The media content stream interface 116, in an example embodiment, comprises a novel configuration of components that are configured to receive and manage received media content. The exemplary media device 102, here illustrated in the media content stream interface 116, comprises a plurality of tuner systems 140. The tuner systems 140 and/or the components therein may be commonly located in the media device 102, as illustrated in FIG. 1. In other embodiments, the tuner systems 140 and/or the components therein may be distributed in different locations and/or may be integrated with other components.

In a non-limiting example embodiment, each tuner system 140 comprises a tuner 142, an optional de-multiplexor (DEMUX) 144, and a tuner buffer 146. Accordingly, the media device 102 has a plurality of tuner systems 140, such as the example first tuner system 140a that has a tuner 142a, an optional DEMUX 144a, and a tuner buffer 146a. Media devices 102 may have any suitable number of tuner systems 140. Some media devices 102 may have different types of tuner systems 140 that are operable to receive different types of media content streams 104 provided by different broadcast-based sources (such as a satellite broadcast system, a cable broadcast system, an over-the-air broadcast system, and/or the Internet).

In an example broadcast environment, a selected one of the tuners 142 in the media content stream interface 116 selectively tunes to one of the media content streams 104 in accordance with instructions received from the processor system 118. That is, each tuner 142 is configured to receive a media content stream 104 with at least a selected media content event of interest. The tuner 140 is an electronic component that is operable to selectively detect different communication signals that are each communicated on a particular frequency (or relatively small frequency range) over a relatively wide range of signals. The tuner is "tuned" to (configured to receive and detect) a particular communication signal by controlling the tuner 140 to detect a specified frequency (or relatively small frequency range). In practice, the tuner system 140 is operated by the processor system 118 to detect signals on a specified frequency (or relatively small frequency range).

For example, in a satellite broadcast environment, the tuner 142a is operated to "tune" to the frequency of the selected transponder channel carrying the media content stream 104 having the particular user-selected media content event. In an over-the-air broadcast-based system, the tuner 142a tunes to the frequency of the over-the-air signal assigned to the broadcast station that is broadcasting the selected media content event of interest. In a cable environment, the tuner 142a tunes to the particular frequency of the data signal that is carrying the user-selected media content event.

The optional de-multiplexor 144 is used when a tuned-to media content stream 104 comprises a plurality of different streaming media content events multiplexed together into the media content stream 104, such as a single media content transport channel signal of a satellite broadcast environment. The de-multiplexor 144 is configured to pick out the particular stream of media content associated with the user-selected media content event of interest from the other streams of media content that also reside in the selected and "tuned-to" media content transport channel.

In a packet-based system wherein discrete portions of a media content event are interleaved with other packetized media content events, the de-multiplexor 144 is operable to select packets that have an identifier that is uniquely associated with the media content of interest. The identifiable selected packets may then be further processed into a stream of media content that is communicated to its corresponding tuner buffer 146.

For example, a first user-selected media content event may be received by the tuner 142a and a second user-selected media content event may be received at the tuner 142b. In a satellite broadcast environment, the de-multiplexor 144a de-multiplexes the first user-selected streaming media content event from the received transport channel, and this first streaming user-selected media content event is then stored (buffered) into the tuner buffer 146a. Similarly, the de-multiplexor 144b de-multiplexes the second user-selected streaming media content event from the corresponding received transport channel, and this second streaming user-selected media content event is stored (buffered) into the tuner buffer 146b. In some operating situations, the tuners 142a and 142b may be tuning to the same transport channel if the first and second user-selected media content events are multiplexed together into the same transport channel. Or, tuners 142a and 142b may be tuned to different transport channels if the first and second user-selected media content events are provided on different transport channels.

With some types of media content streams, the de-multiplexor 144 is not required. For example, an over-the-air RF signal broadcast from a TV station (an exemplary media content provider) may have only a single streaming media content event that is broadcast at a particular frequency (or relatively small frequency range). Accordingly, when the tuner 142 tunes to that particular frequency, only the user-selected media content event is being received in the tuned-to media content stream. Thus, no de-multiplexor 144 is needed.

As each particular streaming media content event is being received at particular tuner 142, the streaming media content event is communicated to and is stored by the corresponding tuner buffer 146. That is, each tuner buffer 146 is configured to store (buffer) at least a portion of the media content stream 104 having the selected media content event of interest.

Each tuner buffer 146 in an example embodiment is a separate memory medium that has a predetermined amount of memory storage capacity. Thus, each tuner buffer 146 is able to buffer a duration of the streaming media content event that is being received by its corresponding tuner 142. The extent of the duration of media content is based on the memory storage capacity of the individual tuner buffer 146 and is based on characteristics of the received media content that is buffered. For example, the tuner buffer 146 may store a longer duration of a media content event that is broadcast using a standard definition format. On the other hand, if the received media content event is broadcast using a high definition format, then a shorter duration may be buffered in the same tuner buffer 146 since high definition content is significantly more data intensive than standard definition content.

In the example embodiment of FIG. 1, the tuner buffer 146 of each one of the plurality of tuner systems 140 is a first memory medium, and the primary content buffer 122 is a second memory medium that is separate from the first memory mediums of the tuner buffers 146 of each of the plurality of tuner systems 140. Here, individual tuner systems 140 (each with a tuner 142, an optional de-multiplexor 144, and a tuner buffer 146) may be separately fabricated as in individual unit. Such individual tuner systems 140 may be added into a media device 102 to provide for any desired number of discrete tuner systems. Alternatively, a plurality of tuner systems 140 may be fabricated together in an integrated manner, wherein integrated units of tuner systems with any desired number of individual tuner systems 140 may be matched with any particular primary content buffer 122. Thus, one primary content buffer 122 can be communicatively coupled to a variety of different integrated tuner system units to facilitate the manufacturing of many media devices 102.

The processor system 118, executing the media device logic 132 and/or the buffer management logic 138, and based upon a request for a particular media content event of interest specified by a user, transfers the stream of media content of the user-selected media content event stored in the tuner buffer 146 to the primary content buffer 122. For example, if the user requests the first media content event being stored in the first tuner buffer 146a, the buffer manager 130 communicatively couples the output of the tuner buffer 146a to the input of the primary content buffer 122. The buffer manager 130 and/or the processor system 118 cause the tuner buffer 146a to communicate its buffered contents to the primary content buffer 122. That is, the buffer manager 130 is configured to manage individual operation of each of the plurality of tuner systems 140.

The media content event of interest stored by the primary content buffer 122 can then be streamed out to components of the media presentation system 106, such as the visual display device 108 and/or the audio presentation device 112, via the presentation device interface 126. Alternatively, or additionally, the buffered out media content may be saved into the DVR 124 for later presentation. The DVR 124 may be directly provided in, locally connected to, or remotely connected to, the media device 102.

From time to time, information populating the EPG information 134 portion of the memory 120 is communicated to the media device 102 in one of the media content streams 104, or via another suitable media. The EPG information 134 stores the information pertaining to the scheduled programming of media content events that are available to the media device 102. The information may include, but is not limited to, a scheduled presentation start and/or end time, a program channel, and descriptive information for each scheduled media content event. The media content event's descriptive information may include the title of the media content event, names of performers or actors, date of creation, and a summary describing the nature of the media content event. Any suitable information may be included in the supplemental information.

The EPG information 134, for each available media content event, includes information that may be used to identify the frequency information that is used to specify the tuner frequency that a tuner 140 needs to tune to in order to detect (receive) a particular media content event. In some embodiments, the frequency information may be included as part of the program channel information. Any suitable means of determining the frequency that a tuner 142 must tune to in order to receive a particular media content event may be used by the various embodiments.

Upon receipt of a command from the user requesting presentation of an EPG display, the information in the EPG information 134 is retrieved, formatted, and then presented on the display 110 as an EPG 148. The exemplary media device 102 is configured to receive commands from a user via a remote control 150. The remote control 150 includes one or more controllers 152 disposed on the surface of the remote control 150. The user, by actuating one or more of the controllers 152, causes the remote control 150 to generate and transmit commands, via a wireless signal 154, to the media device 102. The commands control the media device 102 and/or control the components of the media presentation system 106. The wireless signal 154 may be an infrared (IR) signal or a radio frequency (RF) signal that is detectable by the remote interface 128.

The processes performed by the media device 102 relating to the processing of the received media content stream(s) 104 and communication of a presentable media content event to the components of the media presentation system 106 are generally implemented by the processor system 118 while executing the media device logic 132 and/or the buffer management logic 138. Thus, the media device 102 may perform a variety of functions related to the processing and presentation of one or more media content events received in the media content stream 104.

Returning to the above-described hypothetical illustrative example wherein the tuner 142a has been tuned to the first user-selected media content event (such that the first user-selected media content event has been processed and communicated into the primary content buffer 122 by the tuner system 140a), the first user-selected media content event is presented to the user on the components of the media presentation system 106 in response to receiving a user selection for presentation of the first media content event.

During presentation of the first media content event, the user is able to use one or more of the available presentation trick play functions that permit the user to control presentation of the media content event. Thus, the presentation trick play functions are used to control the flow of the media content (the video frames and the associated audio content) out from the primary content buffer 122 to the components of the media presentation system 106 (the display 110 that presents the video frames and the speakers 114 that synchronously present the audio content).

In an example embodiment, pointers may be generated that have location information that identifies a storage location in the respective tuner buffer 146 (and optionally another pointer for the primary content buffer 122) for a last presented video image frame. These pointers may be stored in the memory 120 or in another suitable memory medium. Each pointer is thus associated with the last presented video image frame of any particular ones of the streaming media content events. For example, if the user initiates operation of a pause function for a currently presented media content event, the generated pointer identifies the memory medium storage location of the last presented video image frame. As more broadcast video image frames are received, they are then stored into the receiving tuner buffer 146 (and/or the primary content buffer 122).

Meanwhile, the second tuner 142b is concurrently receiving the second media content event, which is being processed and is being stored in the second tuner buffer 146b. Further, other media content events are concurrently being tuned to, processed and stored by the other tuner systems 140.

In the event that the user wishes to view a different media content event, the user actuates one of the controllers 152 on the remote control 150 to cause presentation of the EPG 148. The user may then select, via the presented EPG 148, a different media content event for presentation. (Alternatively, the user may actuate one or more of the controllers 152 to directly change to a different channel and/or a different media content event).

When the user changes to a different channel and/or a different media content event, one of two possible situations may occur. One situation that may occur is if the newly selected media content event is not currently being received and buffered by one of the tuner systems 140. Here the processor system 118 selects one of the tuner systems 140 and causes that selected tuner system 140 to tune to the media content stream 104 having the newly selected media content event. The newly selected media content event may then be communicated to the primary content buffer 122 so that the newly selected media content event may be presented to the user. Here, the available presentation trick play function operations that may be used for presentation of the newly selected media content event are limited to duration of the buffered media content that is stored in real time into the primary content buffer 122. For example, no rewind operation is immediately available to the user since there is no accumulated prior duration of the newly selected media content event. However, the pause function may be immediately available to the user.

However, in the event that the newly selected media content event that the user selects is currently being received and buffered by one of the tuner systems 140, the newly selected media content event may be communicated out from the respective tuner buffer 146 into the primary content buffer 122. The user may then watch the newly selected media content event.

In this situation, since some duration of the newly selected media content event has already been buffered, one or more presentation trick play functions may be immediately available to the user to control presentation of the newly selected media content event. For example, the user may initiate a rewind function to view the previously broadcast portion of the newly selected media content event (since the previously broadcast portion of the media content event was saved/buffered into the tuner buffer 146 as it was being broadcast to and received by the media device 102). The rewind operation may continue up to the extent of the total duration of the newly selected media content event that had been previously buffered by the tuner buffer 146.

As the rewind operation is being performed, a pointer is generated that tracks the storage location of the currently presented video image frame being presented during the rewind process. The location information of the pointer is continuously updated, and is then stored when the rewind presentation trick function concludes. The pointer is also similarly generated and stored when other presentation trick function operations are performed.

Further, a pointer may be generated and stored that indicates the location information that identifies the storage location of a last presented video image frame in the tuner that is buffering the previously presented media content event that was being presented prior to receiving the second user selection for the newly selected media content event. Thus, if the user wishes to resume presentation of this particular media content event, the stored pointer may be retrieved so that presentation may resume at the last presentation time.

Some alternative embodiments of the media device 102 may have a separate and dedicated tuner (not shown) that is configured to receive a media content stream 104 having a currently selected media content event. Here, the dedicated tuner would not have an associated tuner buffer. Rather, tuner output would be directly communicated to the primary content buffer 122.

In some embodiments, when the presentation of the user selected second media content event begins (wherein the buffered portion of the streaming second media content event is communicated from the second tuner buffer 146*b* to the primary content buffer 122), a pointer corresponding to the presentation location of the last presented video image frame of the streaming first media content event is determined and stored for later access. Then, in the event that the user wishes to return to presentation of the streaming first media content event, the stored presentation location of the last presented video image frame in the first tuner buffer 146*a* may be retrieved by retrieving the stored pointer. Then, presentation may resume from that last presented video image frame such that the user does not miss any of the content of the streaming first media content event. That is, a "virtual" pause operation is emulated, wherein the presentation of the streaming first media content event is "paused" while presentation of the streaming second media content event occurs. Alternatively, when the user wishes to return to presentation of the streaming first media content event, presentation may resume in real time (such that the user can rewind to view any missed content).

Several unexpected advantages are realized by embodiments of the media content buffer management system 100. First, in the event that a newly selected media content event has already been received by one of the tuner systems 140, some prior duration of the newly selected media content event is streamed out from the respective tuner buffer 140 into the primary content buffer 122. Thus, the user is able to rewind back to view previously broadcasted portions of the newly selected media content event.

For example, if the newly selected media content event is the second media content event being saved into the tuner buffer 146*b*, the prior broadcast portion of the second media content event is communicated from the tuner buffer 146*b* to the primary content buffer 122. Accordingly, the prior broadcast portion of the newly selected media content event is immediately available from the primary content buffer 122 and may be presented to the user.

Further, the first media content event is still being received by the first tuner 142*a*, and is continued to be stored into the tuner buffer 146*a*. Thus, a second unexpected benefit that is realized occurs if the user later switches back to the first media content event (from the previously selected second media content event). Here, the prior broadcast portion of the first media content event (which was received while the second media content event was being presented to the user) is immediately available for presentation to the user since it has been buffered in the tuner buffer 146*a*. That is, if the user selects the first media content event, the first media content event is then transferred from the first tuner buffer 146*a* to the primary content buffer 122. The user may rewind back to see the portion of the first media content event that was received while the second media content event was being viewed.

In some embodiments, the buffer management logic 138 is configured to generate and store memory medium storage location information in the tuner buffer 146 identifying the point in presentation in the first media content event when the user changed presentation to the second media content event. Thus, when the user later changes back to presentation of the first media content event, presentation may resume from that point in time by retrieving the pointer, and then accessing the first media content event based on the storage location information of the first pointer. That is, the user does not need to manually rewind back through the first media content event to the point in time where the user changed from presentation of the first media content event to the second media content event. Presentation simply resumes for the first media content event based on the time of the change from the first media content event to the second media content event. Thus, the user is able to "toggle" back and forth between the first media content event and the second media content event, and may selectively use one or more presentation trick play functions to view desired portions of the first and the second media content events.

For example, the user could view two concurrently broadcasting football matches. When a commercial, time out, or other pause in play occurs during presentation of the first football match, the user may switch over to presentation of the second football match. At a later time, the user may return to presentation of the first football match, use a fast forward operation to advance through the commercial, time out, or other pausing event, and then view resumed play of the first football match. Thus, the user may toggle between the first and second football matches as desired.

Further, the user may toggle between as many different games (or channels of media content) as there are tuner systems 140 in the media device 102. For example, a particular media device 102 may have sixteen different tuner systems 140. So, the user could hypothetically toggle between sixteen different football matches that are concurrently being broadcast to the media device 102.

Some embodiments of the media content buffer management system 100 are configured to tune the plurality of tuner systems 140 automatically prior to a selection of a particular media content event by the user. Thus, another unexpected advantage provided by embodiments of the media content buffer management system 100 is that prior broadcast portions of some media content events are available to the user before the user actually selects that particular media content event for presentation.

For example, returning to the above simplified hypothetical example wherein the user was concurrently viewing the first and the second football matches, assume that a third football match started while the user was viewing the first and/or second football matches. The user might realize, by viewing the EPG 148, that the third football match may have already begun. The user could request presentation of the third football game (knowing that first and second football matches will continue to be buffered by their respective tuner buffers 146 so as to be available for later viewing). If the tuner system 140i had been previously tuned to the media content stream 104 having the third football match, in response to the user selection of the third football match, the content of the tuner buffer 146i is communicated to the primary content buffer 122 so that presentation of the third football match may begin. Here, the user is able to toggle between presentation of the three different football matches as desired. Further, if the user may rewind presentation of the third football match in the event that the user missed presentation of the initial portion of the third football match.

In some embodiments, the user may wish to record into the DVR 124 a particular media content event that is currently being broadcast. The user, via the EPG 148, may select a particular media content event for recording, wherein the broadcast of the selected media content event is already underway. If one of the tuner systems 140 is already tuned to the media content stream 104 having the selected media content event for recording, another unexpected advantage is realized. Here, the previously broadcast initial portion of the media content event is stored in the respective tuner buffer 146 (at least up to the extent of the memory storage capacity of the tuner buffer 146). Thus, the entirety of the selected media content event may be recorded into the DVR 124 for later presentation (even though the user initiated the recording process after the broadcast of the initial portion of the selected media content event).

In the example embodiments of the media content buffer management system 100, the primary content buffer 122 may have a primary content buffer 122 with a memory capacity sufficient to store a predefined duration of media content, such as one hour of media content. The memory capacity of the individual tuner buffers 144a may be less that the memory capacity of the primary content buffer 122, such as having a memory capacity to store a half hour of media content. Alternatively, the memory storage capacity of individual tuner buffers 146 may be greater that the memory storage capacity of the primary content buffer 122. Any suitable memory storage capacity of the primary content buffer 122 and/or the individual tuner buffers 146 may be used by the various embodiments.

Figure 2:
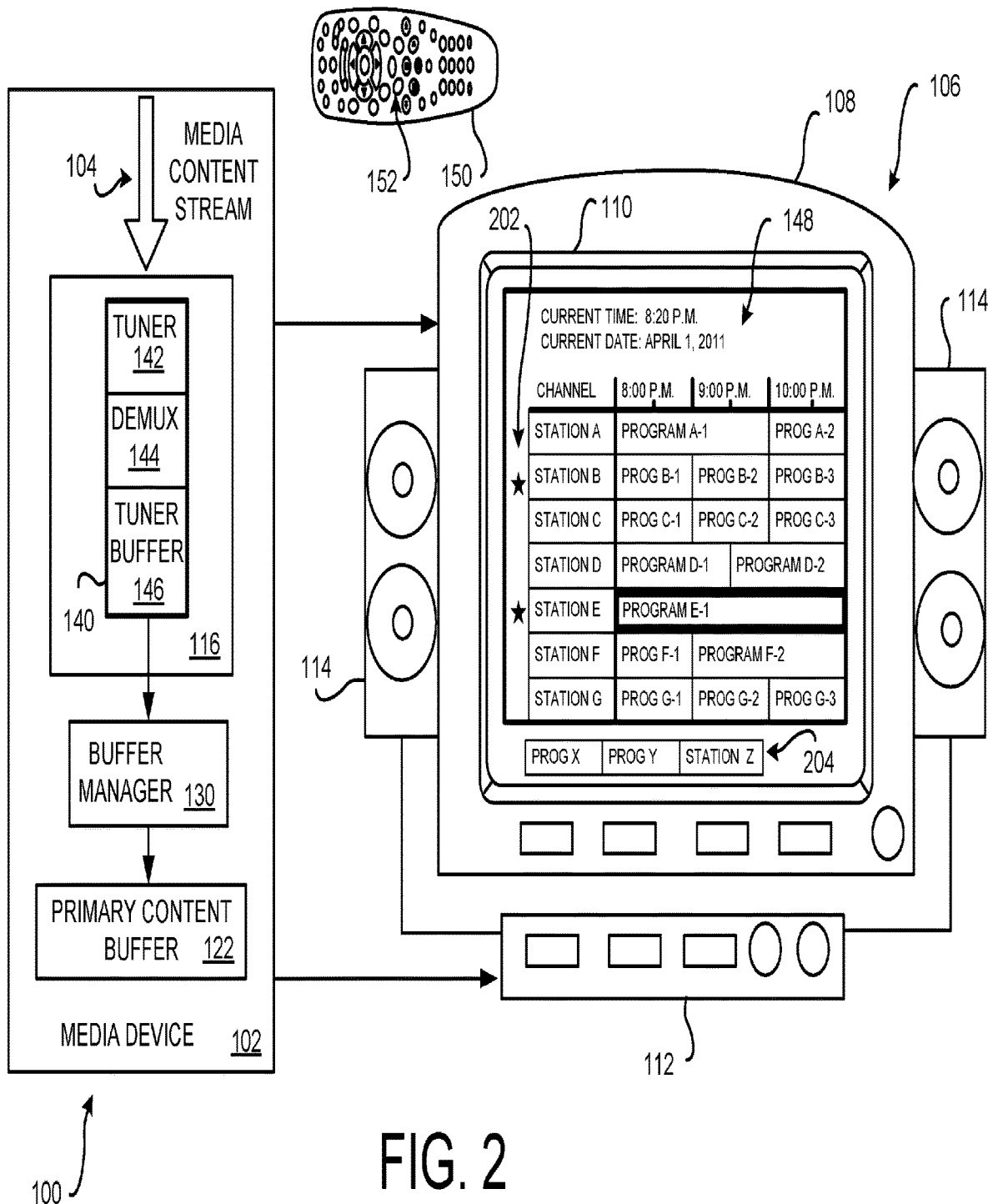
FIG. 2 is a non-limiting example of an electronic program guide (EPG) that may be presented by embodiments of the media content buffer management system.

FIG. 2 is a non-limiting example of an EPG 148 that may be presented by embodiments of the media content buffer management system 100. The EPG 148 is a type of a user interface that presents a menu, or a series of menus, that describe available media content events (interchangeably referred to herein as a program) that are available for presentation. The EPG 148 has the look and feel of a table that uses a combination of text and/or symbols to indicate the program viewing choices that may be selected by the user. The program information presented on the EPG 148 may include the title of available program, the "channel" of the available program, the scheduled time and date of the program presentation, and optionally a brief description of the program. The EPG 148 is interactive with the user. The user, by actuating one or more of the controllers 152 on their remote control 150, is able to "scroll" or "navigate" about the EPG 148 to select a program of interest.

For example, the user may be interested in viewing the "Program E-1" (which is indicated as being highlighted or otherwise indicated by the bold-lining of the EPG menu box). In this example, the user would actuate one or more of the controllers 152 on the remote control 150 to initiate presentation of the "Program E-1" by navigating about the presented EPG 148. In response to the user selection, one of the tuner systems 140 would tune itself to the media content stream 104 having the "Program E-1" that has been selected by the user. The media content stream of the "Program E-1" will then be received by the tuner 142, optionally be de-multiplexed from the media content stream 104 by the de-multiplexor 144, optionally buffered in the tuner buffer 146, and then communicated to the primary content buffer 122 for streaming out to the components of the media presentation system 106.

In the simplified hypothetical example illustrated in FIG. 2, assume that the tuner buffer 146 was already tuned to and was receiving the media content stream having the content being broadcast by "Station E" that is presenting the program of interest ("Program E-1"). Also assume that the tuner buffer 146 has a memory capacity therein sufficient to store one hour of media content.

In this example, the "Program E-1" started at 8:00 p.m. Since the current time is 8:20 p.m. as indicated on the exemplary EPG 148, "Program E-1" has already started. That is, the initial portion of the "Program E-1" (from 8:00 p.m. to 8:20 p.m.) has already been broadcast. When the user selects the "Program E-1" for presentation, in the absence of an embodiment of the media content buffer management system 100, the "Program E-1" is immediately presented beginning with the currently received content that is being received by the media device 102 at 8:20 p.m. In a legacy system that does not have an embodiment of the media content buffer management system 100, the user misses the initial portion of the "Program E-1" from 8:00-8:20 p.m.

Alternatively, exemplary embodiments of the media content buffer management system 100 implemented in the media device 102 may be optionally configured to automatically initiate presentation of the "Program E-1" at its beginning (since the beginning portion has already been saved into the tuner buffer 140) or automatically initiate presentation in real time. In this example, the initial portion of the stored "Program E-1" is transferred from the tuner buffer 140 to the primary content buffer 122. Accordingly, the initial portion of the selected "Program E-1" may be available to the user. The broadcasting remaining portion of the "Program E-1" is continued to be stored in at least the primary content buffer 122 so that as time progresses, the user is presented the "Program E-1" in its entirety. In an example embodiment, presentation of the "Program E-1" begins in real time, here 8:00 p.m. Thus, if the user wishes to see the initial portion of the "Program E-1" that has already been broadcast, the user may initiate rewind operation, jump back operation, or the like. Some embodiments may be configured to automatically begin presentation of at the beginning of the "Program E-1" in response to the user selection. Some embodiments may pre-configure one of the controllers 152 of the remote control 150 to cause presentation of the selected program to start at its beginning. Alternatively, or additionally, the user may pre-configure the media device 102 to automatically present a selected program from its beginning, or initiate presentation of a selected program in real time, via a presented user interface or the like that permits the user to pre-configure operation of the media device 102.

Embodiments of the media content buffer management system 100 may be optionally configured to indicate to the user which particular media content events are currently being tuned to by the plurality of tuner systems 140. For example, an icon 202 (such as the exemplary star) may be shown in a suitable location of the EPG 148 so that the user intuitively appreciates that that the indicated particular media content event is being currently received and buffered by on one of tuner systems 140. For example, the user appreciates that "Station E" and "Station B" are currently tuned to by the plurality of tuner systems 140. Any suitable icon 202 may be used, and/or may be shown in any desired location, on the EPG 148 by the various embodiments.

Since the number of channels that can be shown on the presented EPG 148 at any given time is limited (due to the dimensions of the display 110), some embodiments of the media content buffer management system 100 may be optionally configured to present a listing 204 that identifies other channels, media content events, or the like that other ones of the tuner systems 140 are currently tuned to. Thus, the user appreciates that if one of those indicated channels, media content events, or the like are selected for presentation, previously broadcasted portions of those channels, media content events, or the like will be available for viewing. Any suitable listing 204 may be used, and/or may be shown in any desired location, on the EPG 148 by the various embodiments.

In embodiments having a plurality of tuner systems 140, a corresponding number of different media content events may each be received and buffered into one of the tuner buffers 146. For example, a particular media device 102 may have sixteen different tuner systems 140. So, sixteen different media content events that are being concurrently broadcast to the media device 102 can be received and buffered by the sixteen different tuner systems 140. The particular media content events which are to be tuned to and buffered may be determined in a variety of manners depending upon the particular embodiment of the media content buffer management system 100 and/or its particular configuration.

In an example embodiment, the user is presented the EPG 148 wherein the user is allowed to designate one or more channels, media content events, or stations that the tuner system 140 should be tuned to. The user may select or specify particular media content events via the presented EPG 148. The user may even advance the indicated dates/time of available media content event shown on the EPG 148 to identify a particular media content event that is scheduled for future broadcast. (Here, the user is able to use this option to conserve DVR capacity by not scheduling that particular media content event for recording.) As another example, the user may select a channel of interest that is always buffered, such as a channel that continually broadcasts new segments of sporting events. The user can also select future events that are to be managed by the media content buffer management system 100.

Alternatively, or additionally, one or more of the tuner systems 140 may remain tuned to the particular channels that they were previously tuned to. For example, the "Station B" in FIG. 2 indicates that this station is currently tuned to by one of the tuner systems 140. Here, the user may have viewed a program the previous day on that particular channel, so one of the tuner systems 140 remains tuned to that particular channel.

Alternatively, or additionally, a learning algorithm may be employed to identify user favorites, either particular user favorite channels or user favorite media content events. For example, the user may typically tune to "Station B" on Monday evenings to watch a broadcast of a football match that is presented each Monday evening during football season. As another non-limiting example, the user may regularly view a particular serial program event, such as a comedy program or drama. Based on this learned user behavior, the media content buffer management system 100 may be configured to tune one of the tuner systems 140 to that particular channel and/or media content event. Embodiments may tune an unused one of the tuner systems 140 to that particular channel and/or media content event so that the media content is buffered and available in the tuner buffer 146. Any suitable system and/or method of identifying user favorite channels and/or media content events may be used by the various embodiments to determine which particular media content streams 104 that the plurality of tuner systems 140 should be pre-tuned to.

Further, one or more of the tuner systems 140 may be operating when the user is not currently using media device 102. Accordingly, when the user initially turns on their media device 102, one or more selected previously broadcasted media content events are immediately available from the tuner buffers 146 when user initially begins to use their media device 102.

In an example alternative embodiment, the media device 102 may be configured to present a selection menu to the user when the user initiates operation of the media device 102. Here, when the user initially turns on, powers, or actuates their media device 102, a graphical user interface menu, or even the EPG 148, is presented. The user may then optionally select which particular channels and/or media content events that one or more of the tuner systems 140 will then become tuned to while the media device is presenting a selected media content event to the user. For example, the user may turn on their media device and access a previously recorded media content event from the DVR 124 (FIG. 1). Thus, while the user is viewing the selected media content retrieved from the DVR 124, content from other media content streams 104 may start to become buffered in the tuners 146 for later viewing by the user.

Figure 3:
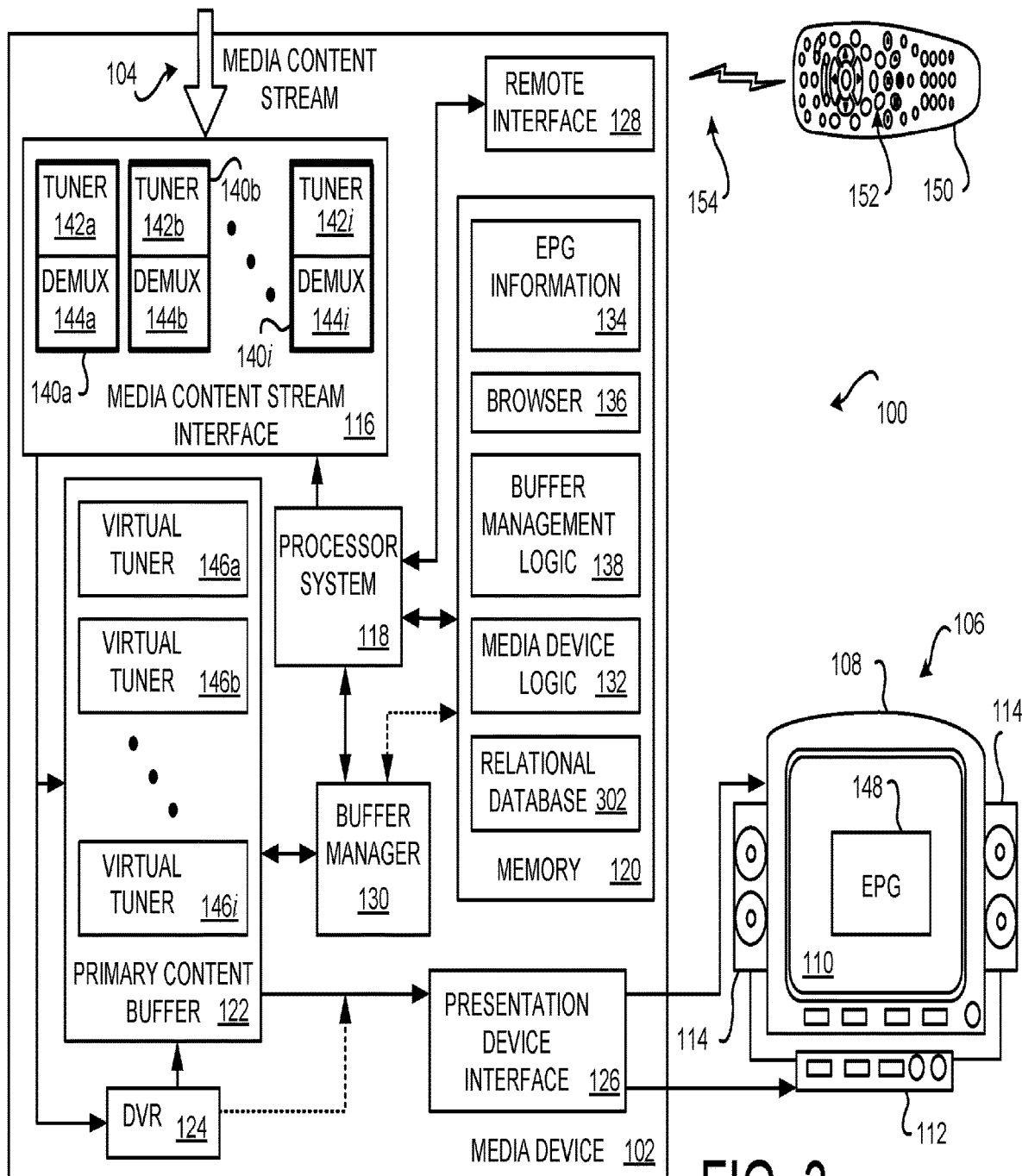
FIG. 3 is a block diagram of an example alternative embodiment of a media content buffer management system.

FIG. 3 is a block diagram of an example alternative embodiment of a media content buffer management system 100. In this example embodiment, the individual tuner buffers 146 are implemented as portions of the primary content buffer 122. Here, as an individual tuner system 140 tunes to and process a particular media content event received in a particular media content stream, the processed stream of media content in buffered into an identifiable portion of the primary content buffer 122.

In this example embodiment, the buffer manager 130 is configured to operate using a logical relational database process. The relational database process uses a plurality of different pointers to identify content storage locations in the primary content buffer 122. That is, the individual tuner buffers 146 are implemented as virtual tuner buffers 146 residing in portions of the primary content buffer 122.

For example, when the first tuner system 140a is initially tuned to a first media content event, the first media content event begins to be stored into the primary content buffer 122 at an identifiable location. The buffer management logic 138 identifies this memory storage location and generates a pointer indicating the memory storage location in the primary content buffer 122 which identifies the beginning of the first media content event. This first pointer is then stored in relational database 302 of the memory 120 or of another suitable memory medium. Then, a second pointer is generated that tracks the location of the continuing storage of the media content event in the primary content buffer 122. The second pointer location information is continually updated and stored in relational database 302 to identify the current memory storage location that is being used to buffer the currently received first media content event. If the user selects this first media content event for presentation, the buffer management logic 138 uses the first and/or second pointers to access the buffered (stored) first media content event from the primary content buffer 122.

If the user initiates one or more presentation trick play functions during presentation of the example first media content event, the buffer management logic 138 generates a third pointer to track the storage location associated with the currently presented first media content event. For example, if the user initiates a pause operation, the third pointer indicates the storage location of the first media content event associated with the time of the pause operation. If the user performs a rewind operation, the third pointer tracks the current presentation location of the first media content event as the rewind operation is being performed. Such third pointers may be stored in relational database 302.

If the user changes to the second media content event, pointers associated with the memory storage locations of the second media content event are accessed from the relational database 302 by the buffer management logic 138. For example, a stored first pointer identifies the memory storage location where the beginning of the second media content event is stored in the primary content buffer 122. The buffer management logic 138 retrieves this first pointer from the relational database 302, accesses the second media content event at its beginning from the primary content buffer 122, and then streams out the second media content event to the components of the media presentation system 106. If presentation is to be based on real time (the time that the user selects the second media content event for presentation), then the buffer management logic 138 simply accesses the second pointer to determine the memory storage location of the currently received portion of the second media content event.

Continuing with the simplified example, if the user later switches back to the first media content event, a third pointer is generated that identifies the memory storage location of the second media content event at the time of the change. This third pointer may be stored in relational database 302. If presentation trick play functions have been previously performed, this third pointer may indicate the location of the presently presented portion of the second media content event.

In response to the user selection to return to the first media content event, the buffer management logic 138 may access one of the first, second, or third pointers associated with the first media content event. For example, if presentation of the first media content event is to resume in real time, the second pointer associated with the first media content event identifies with the storage location of the currently received portion of the first media content event in the primary content buffer 122. This current portion may be then be retrieved from the primary content buffer 122 and communicated to the components of the media presentation system 106. If the last presented portion of the first media content event is to be presented, then the buffer management logic 138 accesses the third pointer associated with the first media content event, uses that memory location information to retrieve the last presented portion of the first media content event.

In the example embodiments of the media content buffer management system 100 that implement virtual buffer tuner 146 portions in the primary content buffer 122. In some embodiments, the primary content buffer 122 may be relatively larger than the primary content buffer 122 used by other embodiments of the media content buffer management system 100. For example, the embodiment of the media content buffer management system 100 illustrated in FIG. 1 may have a primary content buffer 122 with a memory capacity sufficient to store one hour of media content. In contrast, the primary content buffer 122 illustrated in FIG. 3 may have a memory capacity sufficient to store ten hours of media content. Any suitable memory storage capacity of the primary content buffer 122 may be used by the various embodiments.

In an alternative embodiment, the primary content buffer 122 is portioned into predefined portions, wherein each predefined portion is associated with one of the plurality of tuner systems 140. Accordingly, the first pointer is predefined to identify the memory storage location of the start of an associated buffer partition in the primary content buffer 122. A second pointer identifies a memory location corresponding to the ending of that particular partition of the primary content buffer 122. A third pointer for each partition that is uniquely associated one of the tuner systems 140 identifies a current location of use of the content in that particular partition. For example, if the user is watching the first media content event, and then performs a rewind operation for five seconds of presentation time, the third pointer indicates the current presentation location time (five seconds earlier in this simplified example) of the first media content event. If the user changes to the second media content event, the third pointer associated with the first media content event is used to identify the storage location in the primary content buffer 122 of the last presented portion of the first media content event. When the user returns to the first media content event, presentation can resume at the point indicated by that third pointer location (or resume presentation of the first media content event in real time, depending upon the configuration of the media device 102). Presentation of the second media content event may resume at the point indicated by its respective third pointer location, or alternatively, resume presentation of the second media content event in real time, depending upon the configuration of the media device 102.

In some embodiments, the predefining of partitions in the primary content buffer 122 is performed dynamically. For example, if only five of the tuner systems 140 of a fifteen tuner media device 102 are being used for content buffering, the primary content buffer 122 may be partitioned into five portions (rather than fifteen portions). Here, each of the five portions will have a greater memory storage capacity, and thus permit buffering for a longer duration of any particular media content event. If another one or more of the tuner systems 140 becomes operational, then the primary content buffer 122 can be re-partitioned as needed to accommodate buffering of media content by the newly operational tuner systems 140.

Figure 4:
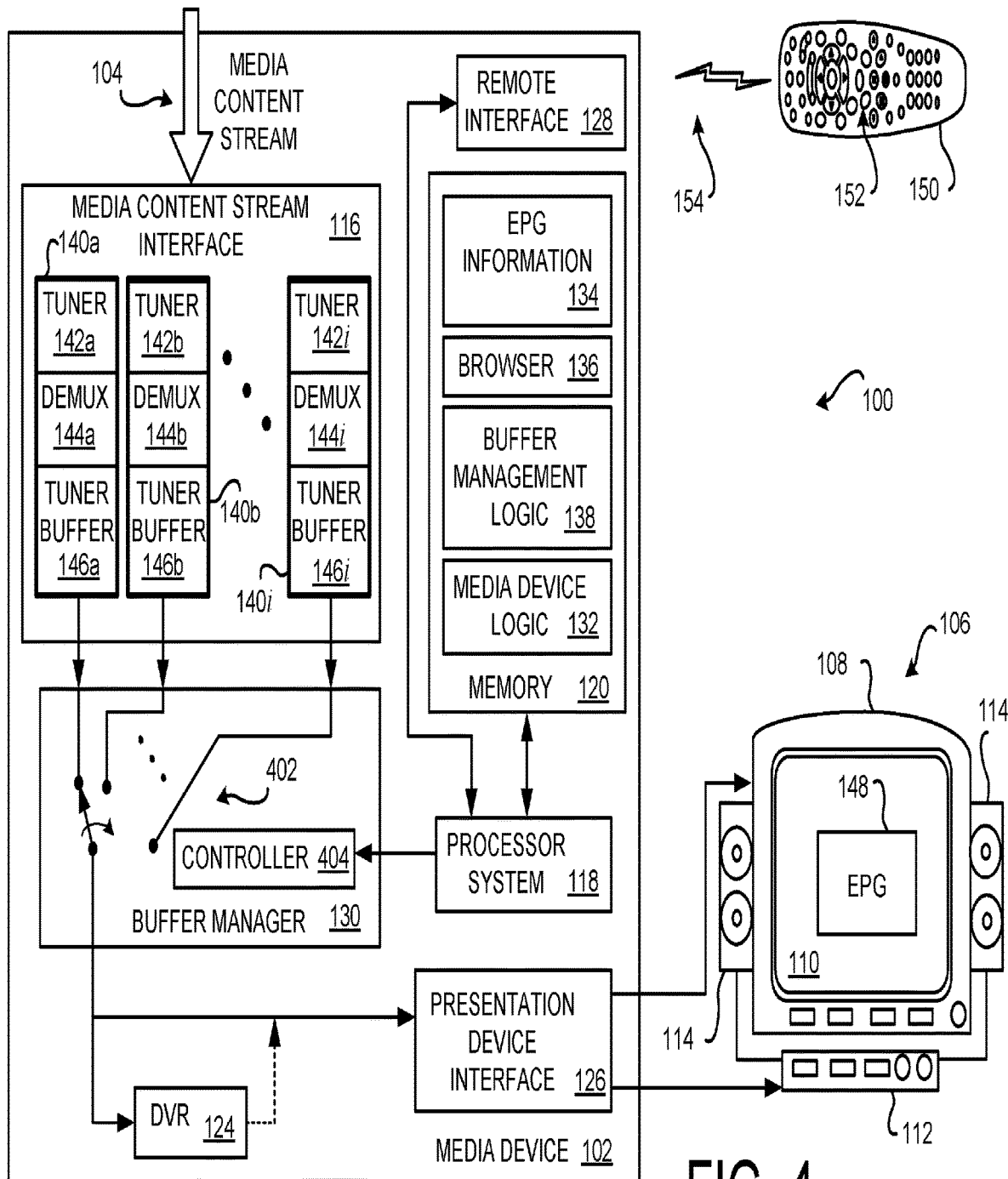
FIG. 4 is a block diagram of an example alternative embodiment of a media content buffer management system.

FIG. 4 is a block diagram of an example alternative embodiment of a media content buffer management system 100 that does not have a primary content buffer 122 (as illustrated in FIGS. 1-3). The buffer manager comprises a switching system 402 that is configured to communicatively couple an output of a selected one of the tuner buffers to an input of the presentation device 126. The controller 402 controls the selection of the tuner buffers 146 made by the switching system 402 based on instructions received from the processor system 118. The buffer manager 130 may be implemented as software, hardware and/or firmware depending upon the embodiment. Further, the example buffer manager 130 may be implemented in other embodiments, such as, but not limited to, the example embodiment illustrated in FIG. 1.

In this embodiment, the buffer manager 130 and processor system 118 cooperatively act to select the particular one of the plurality of tuner systems 140 that is receiving and buffering the currently presented media content event. The output of the particular tuner buffer 146 is directly used to provide output of the media content to the components of the media presentation system 106.

For example, if the tuner system 140*a* was providing the currently selected first media content event, then the content of that tuner buffer 146*a* would be streamed out to the presentation device interface 126. Assume that the second tuner system 140*b* is receiving and buffering the second media content event. If the user changes from the first media content event to the second media content event, then the contents of the tuner buffer 146*b* would be streamed out to the presentation device interface 126 in response to the user selection of the second media content event.

A pointer system may be used to control flow of the media content out from the tuner buffers 146. For example, if the user pauses presentation, the pointer would indicate where the paused content is stored in the tuner buffer 146, while the tuner buffer 146 continues to acquire and buffer the continuing broadcast of the media content event.

In some embodiments, one or more of the tuner systems 140 may be an Internet connection interface. Here, the de-multiplexor 144 may be omitted. The Internet connection interface may receive one or more stream of media content from a web site or the like. Thus, received media content streamed out from the web site via the Internet may be buffered under the control of the buffer manager 130.

It is appreciated that various embodiments of the media device 102 may be configured to receive media content from a variety of different broadcast-based sources and non-broadcast type sources (such as the DVR 124 or an internet site accessed using the browser 136). The media content buffer management system 100, in such embodiments, may be configured to concurrently manage presentation of media content received from the different media content sources. In such embodiments, the media content received from non-broadcast type sources may be buffered into one of the tuner buffers 146 or another suitable buffer medium so that presentation of media content received from a plurality of broadcast-based sources and non-broadcast type sources can be managed in a coordinated manner.

For example, the user may be concurrently viewing a satellite broadcast of a first football match, an over-the-air broadcast of a local football match, and a previously recorded football match stored in the DVR 124. The buffer manager 130 simply tracks the actual presentation of the three football matches to the user. Thus, the user is able to toggle viewing among the three football matches, and is able to use the various presentation trick play functions as desired in accordance with the various embodiments described herein.

It should be emphasized that the above-described embodiments of the media content buffer management system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for presenting media content received by a media device, wherein the media device comprises a plurality of tuner systems that includes at least a first tuner system and a second tuner system, the method comprising:
   selecting first and second broadcasting media content streams based on a routine behavior of a user associated with one or more channels or content events provided by the first broadcasting media content stream or the second broadcasting media content stream;
   tuning a first tuner of the first tuner system to receive the first broadcasting media content stream;
   storing a portion of the first broadcasting media content stream into a first tuner buffer of the first tuner system;
   tuning a second tuner of the second tuner system to receive the second broadcasting media content stream;
   storing a portion of the second broadcasting media content stream into a second tuner buffer of the second tuner system;
   receiving a user selection for presentation of one of the first and second broadcasting media content streams;
   storing the portion of the first broadcasting media content stream in a primary content buffer and generating a pointer to location information for a video image frame in the second tuner buffer in response to the user selection of the first broadcasting media content stream;
   storing the portion of the second broadcasting media content stream in the primary content buffer and generating a pointer to location information for a video image frame in the first tuner buffer in response to the user selection of the second broadcasting media content stream; and communicating the selected one of the first and second broadcasting media content streams for presentation on a display.

2. The method of claim 1, further comprising receiving a second user selection for presentation of the other of the selected one of the first broadcasting media content stream and the second broadcasting media content stream; and communicating the other of the selected one of the first broadcasting media content stream and the second broadcasting media content stream for presentation on the display beginning at the video image frame associated with the corresponding pointer.

3. The method of claim 1, wherein storing the portion of the first broadcasting media content stream into the first tuner buffer of the first tuner system comprises storing the portion of the first broadcasting media content stream into a first memory medium of the first tuner buffer, wherein storing the portion of the second broadcasting media content stream into the second tuner buffer of the second tuner system comprises storing the portion of the second broadcasting media content stream into a second memory medium of the second tuner buffer, wherein the primary content buffer comprises a third memory medium, and wherein the first memory medium, the second memory medium and the third memory medium are different memory mediums.

4. The method of claim 1, wherein the first and second broadcasting media content streams each comprise a plurality of different media content events multiplexed together, and further comprising:

de-multiplexing first and second media content events from the corresponding plurality of different media content events; and outputting the first and second media content events to an input of the corresponding tuner buffer.

5. The method of claim 1, wherein selecting first and second broadcasting media content streams based on past user behavior includes using a learning algorithm to identify favorite channels or favorite media content events.

6. The method of claim 1, further comprising:

generating, with the media device, an electronic program guide (EPG) that is presented to a user, and wherein receiving the user selection for presentation of one of the first broadcasting media content stream and the second broadcasting media content stream is made by the user via the presented EPG.

7. The method of claim 6, wherein the EPG presents at least one icon that identifies at least one media content event indicated on the EPG, and wherein the icon indicates that the identified media content event is currently being received by one of the plurality of tuner systems.

8. The method of claim 6, wherein the EPG presents a listing that identifies at least one of a channel or a media content event, wherein the listing indicates that the at least one of a channel or a media content event is currently being received by one of the plurality of tuner systems.

9. A non-transitory computer-readable storage medium comprising a set of instructions that, when executed by one or more processors, cause a machine to:

select first and second broadcasting media content streams based on a routine behavior of a user associated with one or more channels or content events provided by the first broadcasting media content stream or the second broadcasting media content stream;

tune a first tuner of a first tuner system of a media device to receive the first broadcasting media content stream;

store a portion of the first broadcasting media content stream into a first tuner buffer of the first tuner system;

tune a second tuner of a second tuner system of the media device to receive the second broadcasting media content stream;

store a portion of the second broadcasting media content stream into a second tuner buffer of the second tuner system;

receive a user selection for presentation of one of the first and second broadcasting media content streams;

store the portion of the streaming first broadcasting media content stream in a primary content buffer and generating a pointer to location information for a video image frame in the second tuner buffer in response to the user selection of the first broadcasting media content stream;

store the portion of the second broadcasting media content stream in the primary content buffer and generating a pointer to location information for a video image frame in the first tuner buffer in response to the user selection of the second broadcasting media content stream; and communicate the selected one of the first and second broadcasting media content streams for presentation on a display.

10. The non-transitory computer-readable storage medium of claim 9, further comprising instructions to:

receive a second user selection for presentation of the other of the selected one of the first broadcasting media content stream and the second broadcasting media content stream; and communicate the other of the selected one of the first broadcasting media content stream and the second broadcasting media content stream for presentation on the display beginning at the video image frame associated with the corresponding pointer.

11. The non-transitory computer-readable storage medium of claim 9, wherein storing the portion of the first broadcasting media content stream into the first tuner buffer of the first tuner system comprises storing the portion of the first broadcasting media content stream into a first memory medium of the first tuner buffer, wherein storing the portion of the second broadcasting media content stream into the second tuner buffer of the second tuner system comprises storing the portion of the second broadcasting media content stream into a second memory medium of the second tuner buffer, wherein the primary content buffer comprises a third memory medium, and wherein the first memory medium, the second memory medium and the third memory medium are different memory mediums.

12. The non-transitory computer-readable storage medium of claim 9, wherein selecting first and second broadcasting media content streams based on past user behavior includes using a learning algorithm to identify favorite channels or favorite media content events.

13. The non-transitory computer-readable storage medium of claim 9, wherein the first and second broadcasting media content streams each comprise a plurality of different media content events multiplexed together, and further comprising instructions to:

de-multiplex the first and second media content events from the corresponding plurality of different media content events; and output the first and second media content events to an input of the corresponding tuner buffer.

14. The non-transitory computer-readable storage medium of claim 13, further comprising instructions to:

generate, with the media device, an electronic program guide (EPG) that is presented to a user, and wherein receiving the user selection for presentation of one of the streaming first media content event and the streaming second media content event is made by the user via the presented EPG.

15. The non-transitory computer-readable storage medium of claim 14, wherein the EPG presents a listing that identifies at least one of a channel or a media content event, wherein the listing indicates that the at least one of a channel or a media content event is currently being received by one of the plurality of tuner systems.

* * * * *